United States Patent [19]
Lamb

[11] Patent Number: 5,720,126
[45] Date of Patent: Feb. 24, 1998

[54] MOUSE CATCHING APPARTUS

[76] Inventor: George K. Lamb, Box 340, Gruver, Tex. 79040

[21] Appl. No.: 752,288

[22] Filed: Nov. 19, 1996

[51] Int. Cl.⁶ .................................................. A01M 23/10
[52] U.S. Cl. ............................................. 43/72; 43/69
[58] Field of Search ............................ 43/64, 69, 70, 43/71, 72, 74

[56] References Cited

U.S. PATENT DOCUMENTS

| | | | |
|---|---|---|---|
| 2,218,403 | 10/1940 | McKee | 43/69 |
| 2,234,983 | 3/1941 | Russell | 43/69 |
| 2,619,765 | 12/1952 | Sees | 43/64 |
| 3,528,191 | 9/1970 | Hand | 43/64 |
| 4,429,483 | 2/1984 | Murakami | 43/70 |
| 4,662,101 | 5/1987 | Fisher | 43/69 |
| 4,845,887 | 7/1989 | Snider | 43/71 |
| 5,517,784 | 5/1996 | Sedore | 43/69 |
| 5,528,852 | 6/1996 | Sarff | 43/69 |
| 5,579,601 | 12/1996 | Norrad | 43/64 |

Primary Examiner—Jack W. Lavinder
Attorney, Agent, or Firm—Norman B. Rainer

[57] ABSTRACT

A portable apparatus for catching rodents includes a container adapted to hold a reservoir of water. A horizontally oriented cylindrical roller is rotatively supported within the container above the water reservoir. A moveable bait-holding arm is positioned above the roller. When a rodent pushes against the bait-holding arm, an electrical circuit is completed which energizes a motor to rotate the roller, causing the rodent to fall into the water reservoir.

10 Claims, 2 Drawing Sheets

MOUSE CATCHING APPARTUS

BACKGROUND OF THE INVENTION

1. Field of the Invention

The present invention relates to rodent traps, and more particularly concerns a trap capable of collecting a multitude of rodents such as mice and rats.

2. Description of the Prior Art

The use of baited spring-activated devices for killing mice is well known. Such devices must be monitored and re-set after each mouse encounter. This task is generally considered unpleasant because of the danger to the operator in setting the trap and the need to handle wounded and dead rodents and severed parts thereof. Also, the loud noise produced by the snap of the spring alerts other rodents to the peril of the trap.

The use of mouse traps employing water-filled containers to drown and collect mice is disclosed in U.S. Pat. No. 4,241,531 to Nelson et. al. and U.S. Pat. No. 4,845,887 to Snyder. Such traps afford the convenience of collecting a number of mice, which can easily be disposed of merely by pouring the water and dead mice out of the container.

Although rodents are attracted to a trap primarily by the scent of the bait, their visual perception of the trap and its surroundings may well influence their decision to approach the trap. The traps of Snyder and Nelson et. al. involve labyrinthal, constrictive passageways which prevent the rodent from actually seeing the bait.

Various pivoted platforms, known as "trap doors" have been disclosed for catching mice by causing the mice to fall by gravity into an underlying holding chamber which may contain water. Examples of trap doors are found in U.S. Pat. Nos. 271,952; 506,954; 639,246; 1,185,452; 1,228,324; and 1,578,080. Other means have also been variously disclosed for causing a mouse to fall into a holding chamber. However, the very fast reflex actions of mice often enable them to jump clear of the trap door or other mechanism.

The use of a horizontally disposed roller has been disclosed in U.S. Pat. No. 2,565,142 for causing insects which tangentially approach the roller to fall into a holding chamber. Surfaces closely adjacent the roller prevent the insects from escaping. If this principle were to be applied to the trapping of mice, the mouse, having tangentially mounted the roller, would detect motion and would have sufficient time to jump off the roller and onto the closely adjacent surfaces.

It is accordingly an object of the present invention to provide a rodent catching apparatus which utilizes an attractant bait and collects mice in a water-confining container.

It is another object of this invention to provide apparatus as in the foregoing object which provides a direct line of sight and direct path of travel between the bait and a rodent entering said trap.

It is a further object of the present invention to provide apparatus of the aforesaid nature which does not involve features capable of injuring the user.

It is yet another object of this invention to provide apparatus of the aforesaid nature which does not require manual re-setting by the user following the catching of a rodent.

Still further objects of the present invention are to provide apparatus of the aforesaid nature which is easy to use, durable, and of simple construction amenable to low cost manufacture.

These objects and other objects and advantages of the invention will be apparent from the following description.

SUMMARY OF THE INVENTION

The above and other beneficial objects and advantages are accomplished in accordance with the present invention by a rodent catching apparatus comprising:

a) a container comprised of a bottom panel and a sidewall upwardly directed from said bottom panel and terminating in an open upper extremity.

b) a horizontally disposed roller elongated between first and second extremities and having a circular cylindrical configuration with respect to a center axis, thereby defining top and bottom tangential extremities, said roller secured for rotation about said axis at an elevation disposing said top tangential surface adjacent the upper extremity of said sidewall, c) a support platform held by said sidewall and extending to a distal extremity, d) an electric motor supported upon said platform and equipped with drive means coupled to said roller, said motor being connected to an electrical power source, e) an upwardly directed bracket held by said distal extremity above said roller and securing a resilient bait-holding arm which, when pushed toward said bracket, achieves completion of an electrical circuit that energizes said motor to rotate said roller, and f) a lid configured to removably engage the open upper extremity of said container, thereby defining with said container an enclosure region, said lid having a rodent entry portal positioned in alignment with said top tangential extremity at the second extremity of said roller.

In a preferred embodiment, an inclined ramp extends between said portal and ground level.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
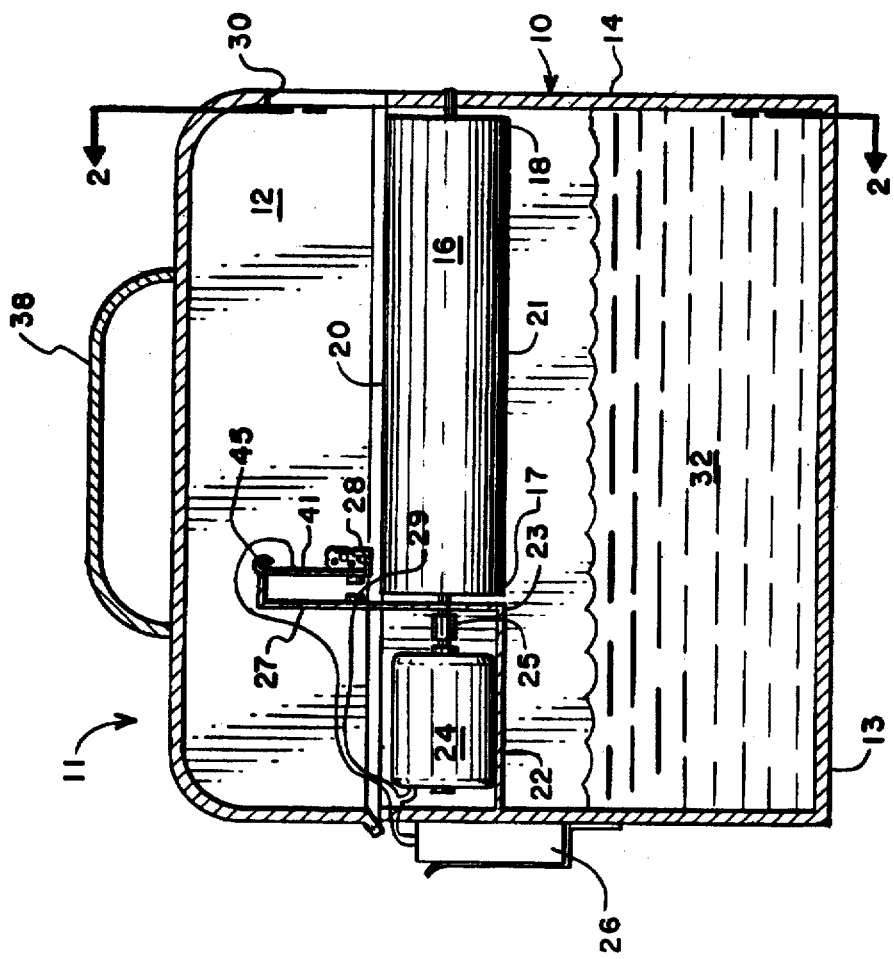
FIG. 1 is a sectional side view of an embodiment of the rodent catching apparatus of the present invention.
Figure 2:
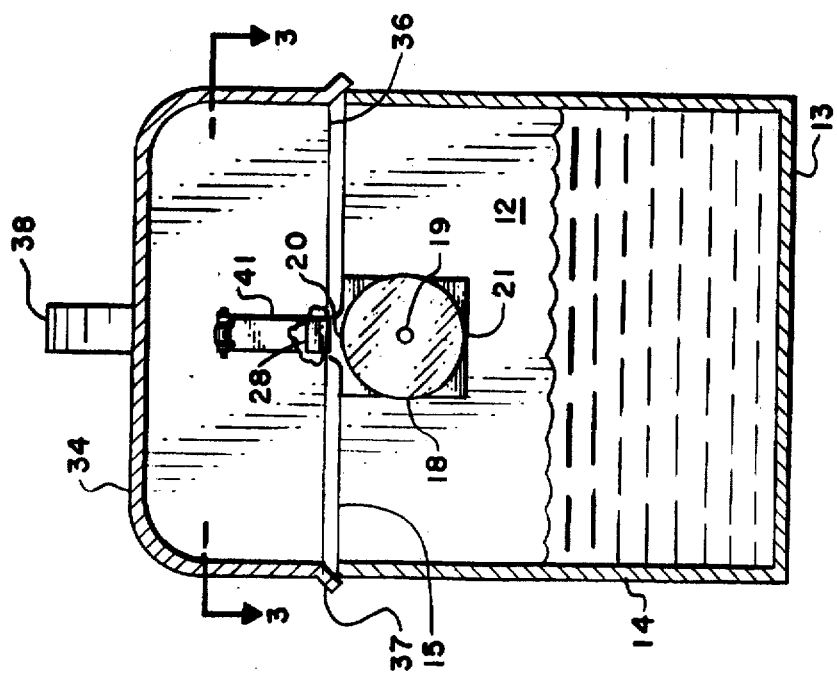
FIG. 2 is a sectional view taken in the direction of the arrows upon the line 2—2 of FIG. 1.
Figure 4:
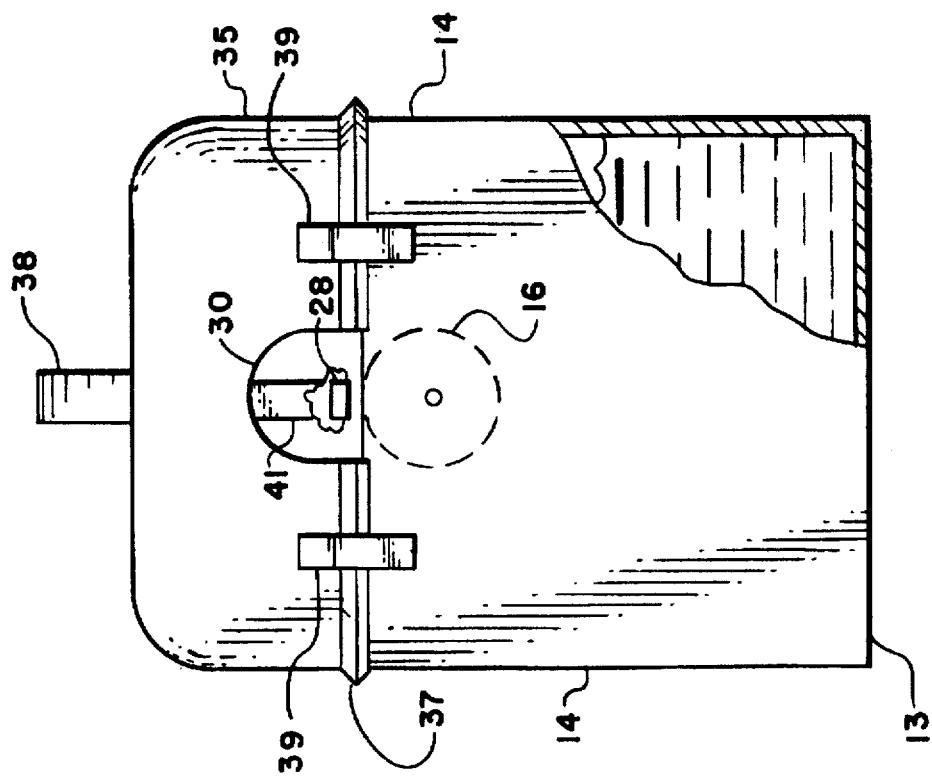
FIG. 4 is a front view of the apparatus taken from the right of FIG. 1.
Figure 3:
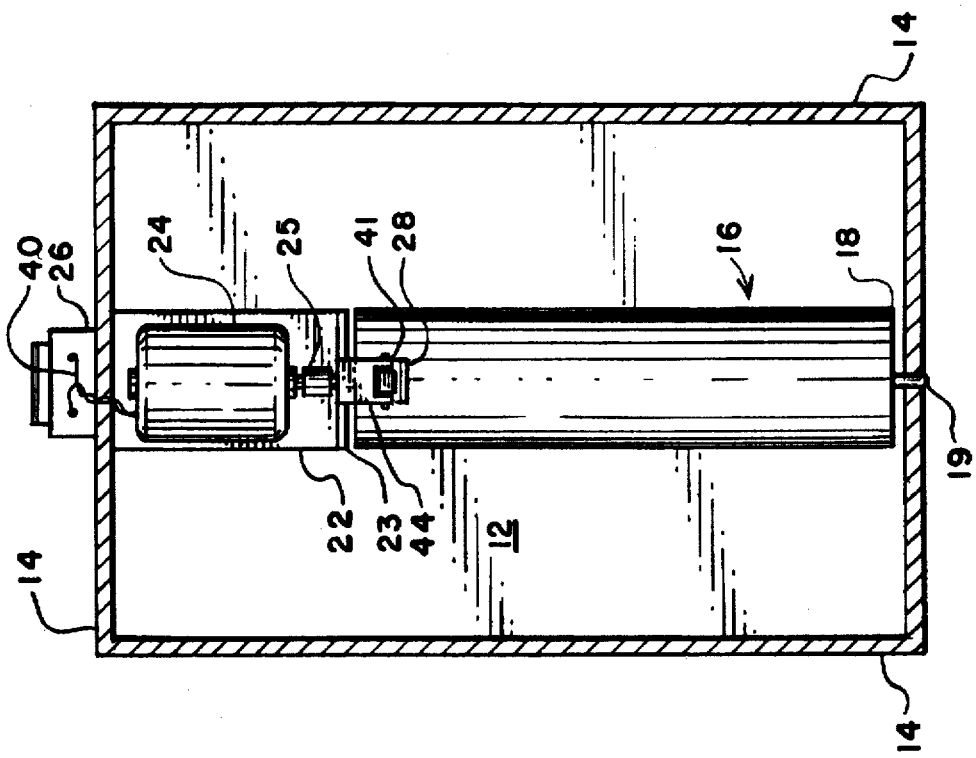
FIG. 3 is a sectional view taken in the direction of the arrows upon the line 3—3 of FIG. 2.

Referring to FIGS. 1-4, an embodiment of the rodent catching apparatus of the present invention is shown comprised of container 10, and covering lid 11 removably seated upon said container to define therewith enclosure region 12.

Container 10 is constructed to have a flat bottom panel 13 and an encircling sidewall 14 upwardly directed from said bottom panel and terminating in a substantially planar open upper extremity 15. The sidewall may be of circular, rectangular or other shape, viewed in horizontal section. The container is of water-tight construction and preferably formed as a monolithic structure fabricated of plastic by way of a molding operation. Lid 11 is comprised of top panel 34 and downwardly directed skirt wall 35 terminating in lowermost open extremity 36 configured to mate with upper extremity 15 of said container. A downwardly turned perimeter lip 37 ensures said mating interaction. A carrying handle 38 may be centered on top panel 34. Lever-action latching devices 39 may be interactively associated with said lid and container to facilitate the lifting and transport of the entire unified apparatus. The lid is also preferably fabricated of plastic, and preferably has a window to permit viewing of said enclosure region.

A horizontally disposed roller 16 elongated between first and second extremities 17 and 18 respectively, and having a circular cylindrical configuration with respect to a center axle 19, is journaled to said sidewall for rotative movement about said axle. The roller may be further characterized as having top and bottom tangential extremities 20 and 21, respectively, said top tangential extremity being disposed at substantially the same elevation as upper extremity 15 of said container. The arcuate boundary surface of the roller is preferably sufficiently hard and smooth as to prevent gripping by a rodent. Any rodent standing upon the top tangential extremity of the roller does so by balance alone, and not by a gripping action on the roller. In the exemplified embodiment, second extremity 18 of the roller is journaled to the sidewall. In alternative embodiments, both extremities of the roller may be journaled to the sidewall at diametrically opposed sites. The roller is preferably centrally positioned with respect to said sidewall.

A support platform 22 is emergent from sidewall 14 adjacent upper extremity 15, and extends into the container to a distal extremity 23. The support platform is of rigid construction, fabricated of plastic, wood, metal or equivalent material, and may be integral with said sidewall as a continuous extension thereof, having been formed during a molding operation which produces container 10.

An electric motor 24 is supported upon said platform and is equipped with drive means such as coupling 25 which engages axle 19 protruding from first extremity 17 of the roller. The motor is connected by electrical conductor wire 40 to an electrical power source such as battery 26 mounted upon the exterior of sidewall 14.

An upwardly directed L-shaped bracket 27, preferably of electrically non-conductive construction, is held by distal extremity 23 above said roller. A metallic arm 41 is pendently secured by bracket 27 in a manner permitting swinging movement in a vertical path. Said swinging movement is achieved either by virtue of pivot means 45 interactive with the upper extremity of arm 41, or by virtue of thin spring-like construction of said arm. The lowermost extremity of said arm is disposed above top tangential extremity 20, and holds a scented bait 28. Said arm 41, when pushed in the direction of the first extremity 17 of the roller, touches fixed contact post 29 held by bracket 27. Such action completes an electrical circuit that energizes motor 24 to rotate said roller. Adjustment means to precisely control the distance that arm 41 must be displaced to complete an electric circuit may be associated with arm 41 or bracket 27.

Lid 11 has a rodent entry portal 30 positioned in alignment with the top tangential extremity of the roller adjacent second extremity 18. A removable ramp may be positioned between portal 30 and the ground upon which bottom panel 13 is resting.

By virtue of the aforesaid components and their interaction, a rodent, attracted by the scent of the bait, enters portal 30, and sees the bait 28. The rodent then proceeds, walking by balance alone, upon the top tangential extremity of the roller. When the rodent touches the bait and thereby pushes arm 41 into contact with post 29, the motor is activated to rotate the roller. The rotation of the roller causes the rodent to lose balance and fall from the roller into water 32 held within said container. Removal of the drowned rodents is easily achieved merely by removing lid 11 and pouring away the contents of the container.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. A rodent catching apparatus comprising:
   a) a container comprised of a bottom panel and a sidewall upwardly directed from said bottom panel and terminating in an open upper extremity,
   b) a horizontally disposed roller elongated between first and second extremities and having a cylindrical configuration with respect to a center axis, thereby defining top and bottom tangential extremities, said roller secured for rotation about said axis at an elevation disposing said top tangential extremity adjacent the upper extremity of said sidewall,
   c) a support platform secured by said sidewall and disposed within said container,
   d) an electric motor supported by said platform and equipped with drive means coupled to said roller, said motor being connected to an electrical power source,
   e) an upwardly directed bracket held by said platform above said roller and securing a bait-holding arm which, when pushed toward said bracket, achieves completion of an electrical circuit that energizes said motor to rotate said roller, and
   f) a lid configured to removably engage the open upper extremity of said container, thereby defining with said container an enclosure region, said lid having a rodent entry portal positioned in alignment with said top tangential extremity at the second extremity of said roller.

2. The apparatus of claim 1 further including a ramp interactive with said portal.

3. The apparatus of claim 1 wherein said bottom panel is substantially flat.

4. The apparatus of claim 3 wherein said open upper extremity is of planar configuration.

5. The apparatus of claim 1 wherein said container is of water-tight construction.

6. The apparatus of claim 1 wherein said roller is centrally positioned with respect to said sidewall, and the second extremity of said roller is rotatively journaled to said sidewall.

7. The apparatus of claim 1 wherein said roller has an arcuate exterior boundary surface that is sufficiently hard and smooth as to prevent gripping by a rodent.

8. The apparatus of claim 1 wherein said bait-holding arm is pendently secured by said bracket.

9. The apparatus of claim 8 wherein said bait-holding arm has a lowermost extremity that is disposed above said top tangential extremity.

10. The apparatus of claim 1 wherein said bracket has an electrical contact post which is interactive with said bait-holding arm to complete an electrical circuit.

\* \* \* \* \*